G. M. GOULD.
TRAP.
APPLICATION FILED NOV. 26, 1921.

1,422,049.

Patented July 4, 1922.

George M. Gould,
INVENTOR

BY Victor J. Evans
ATTORNEY

WITNESS:

UNITED STATES PATENT OFFICE.

GEORGE M. GOULD, OF MADISON, SOUTH DAKOTA.

TRAP.

1,422,049. Specification of Letters Patent. Patented July 4, 1922.

Application filed November 26, 1921. Serial No. 517,991.

*To all whom it may concern:*

Be it known that I, GEORGE M. GOULD, a citizen of the United States, residing at Madison, in the county of Lake and State of South Dakota, have invented new and useful Improvements in Traps, of which the following is a specification.

My present invention has reference to a mouse trap.

My object is to produce a mouse trap in which a flanged jaw is pivotally supported upon a flanged base and in which spring means normally forces the jaw closed on the base, while a bait carrying member is pivoted to the base and is provided with a trigger that passes through a slot in the jaw to cause the trigger to engage one of the walls of the notch to hold the jaw open on the base.

It is a further object to produce a mouse trap that includes a base which supports a spring influenced jaw and includes a bait carrying member which is hingedly secured to the base and which is provided with a trigger to engage the jaw, the construction being such that when the jaw is swung to open position on the base and the device, as a whole, is turned to one position, the trigger will automatically engage the jaw to hold the same in active position, and thus wholly avoid liability of injury to the person setting the trap.

The drawing which accompanies and forms part of this specification, illustrates a satisfactory embodiment of the improvement reduced to practice, and wherein:—

Figure 1:
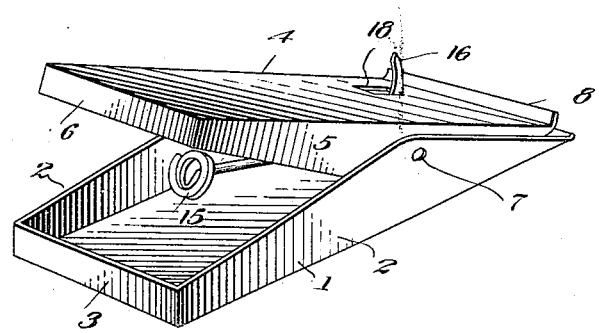
Figure 1 is a perspective view showing a trap in accordance with this invention in set condition.
Figure 2:
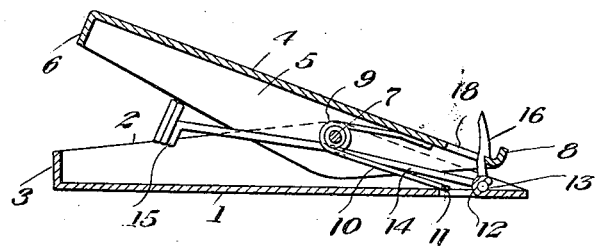
Figure 2 is an approximately central vertical longitudinal sectional view through the improvement.
Figure 3:
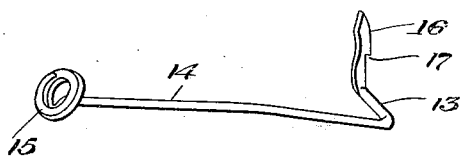
Figure 3 is a perspective view of the combined bait holder and trigger.

As disclosed by the drawings my improvement contemplates the employment of a base and a jaw. Preferably, both of these elements are constructed of metal. The base is indicated by the numeral 1 and is provided with upwardly extending side flanges 2 and a front flange 3. By reference to the drawings, it will be noted that the side flanges have their edges disposed at an upward inclination from the front flange 3, and from thence at a rearward inclination to the back of the base 1.

The jaw 4 has its body portion of a substantially rectangular formation and is of a size slightly less than that of the base 1. The jaw is of a construction substantially similar to that of the base, the same having side flanges 5 and an outer or front flange 6. The side flanges 5 have their edges beveled outwardly to a point adjacent to the rear thereof and from thence beveled inwardly to the said rear. These side flanges are received between the side flanges of the base and a pivot member 7 passes through the said flanges at a point adjacent the juncture of the angle edges of the side flanges of the base 1. The rear of the jaw 4 is formed with an upturned flange 8 which may serve as a finger hold whereby the jaw may be swung to open position on the base.

Surrounding and secured to the pivot 7 is the coiled portion 9 of a spring. From the coil 9 there is a rearwardly extending arm 10 that has an offset end 11 which is in contacting engagement with the base 1. As the pivot is fixed to the sides of the jaw and is freely mounted in openings in the sides of the base, it will be apparent that the springs contacting with the base will influence the jaw to closed position on the base.

The base, adjacent to the rear thereof is slitted longitudinally and transversely, and the metal bounded by this slit is rolled from the base to provide an eye 12. In this eye there is journaled the angle end 13 of a combined bait holder and trigger. This element is constructed of a single strand of wire including an arm 14 which extends from the angle portion 13 between the jaw and base, the said arm having its outer end coiled upon itself to provide a bait receptacle 15. The opposite end of the angle portion 13 is extended upwardly to provide the trigger member 16. The trigger is notched, as at 17, and the top of the jaw is provided with a slot 18 through which the trigger passes. The weighted bait holding end of the combined bait holder and trigger will, when the jaw is swung open on the base and the device inverted, influence the trigger of the device to cause the notch thereof to engage in the wall provided by the slot 18, and thus hold the jaw open on the base.

It is thought that the foregoing description, when taken in connection with the drawings will fully set forth the construction and advantages of the improvement and that further detailed description will therefore not be required.

Having described the invention, I claim:—

A mouse trap including a base having a flanged outer end and flanged sides, a jaw having a flanged outer end and flanged sides which are received between the sides of the base and which are pivoted thereto, spring means influencing the jaw to closed position, a wire member having its outer end coiled upon itself to provide a bait box and having an angle end which is journaled in a bearing at the rear of the base and which has a notched angle extension providing a trigger, the body of the jaw having a slot to receive therethrough the trigger when the jaw is swung to open position on the base and when turned to one position, incident to the weighted bait holding end of the wire member to swing the latter to cause the notch of the trigger to engage with the said wall of the opening in the jaw.

In testimony whereof I affix my signature.

GEORGE M. GOULD.